United States Patent

Rall et al.

[11] 4,274,475
[45] Jun. 23, 1981

[54] CONTROL APPARATUS FOR REGULATING BUILDING PERIMETER TEMPERATURE CHANGE SYSTEM

[76] Inventors: Dieter Rall, 405 Catalina Dr., Newport Beach, Calif. 92663; David R. Hornbaker, 1520 Cole Way, La Habra, Calif. 90631; William W. Sawyer, 1202 Longwood Rd., Lake Forest, Ill. 60045

[21] Appl. No.: 45,279

[22] Filed: Jun. 4, 1979

[51] Int. Cl.³ .................... G01K 17/00; G05D 23/00
[52] U.S. Cl. .............................. 165/12; 73/190 H; 236/1 R; 236/47
[58] Field of Search ............... 236/46 R, 1 R, 91 C, 236/91 E, 78 B, 91 D, 47; 165/12, 26; 62/209; 73/190 H

[56] References Cited

U.S. PATENT DOCUMENTS

| | | | |
|---|---|---|---|
| 2,170,072 | 8/1939 | Hartig | 236/78 B |
| 2,666,586 | 1/1954 | Locke et al. | 236/91 C X |
| 2,691,889 | 10/1954 | Dion et al. | 236/78 B UX |
| 3,542,123 | 11/1970 | Hornbaker | 165/39 |
| 3,952,947 | 4/1976 | Saunders | 62/238 E |

OTHER PUBLICATIONS

Instrumentation for Process Control, Anderson, 1972, pp. 8-10.

Primary Examiner—William E. Wayner
Attorney, Agent, or Firm—Fulwider, Patton, Rieber, Lee & Utecht

[57] ABSTRACT

A control apparatus for regulating a building perimeter temperature change system, which may be a heating system, a cooling system, or both. The control apparatus operates in conjunction with a central heating system which operates to adjust temperatures in the building. The building is characterized by net heat gains or losses at the building perimeter. These net heat gains and losses are made up by the building perimeter temperature change system under the regulation of the present control apparatus. The apparatus includes a heat flow sensor for mounting upon an exterior building element to generate a sensor signal proportional to the direction and magnitude of heat flow to or from the building element. A controller responsive to the sensor signal operates the temperature change system so that the rate of perimeter heating or cooling is directly proportional to the measured rate of heat loss or gain through the building element.

12 Claims, 7 Drawing Figures

CONTROL APPARATUS FOR REGULATING BUILDING PERIMETER TEMPERATURE CHANGE SYSTEM

BACKGROUND OF THE INVENTION

1. Field of the Invention

The present invention relates to a control apparatus for regulating perimeter heating or cooling of a building according to the direction and magnitude of heat flow through building elements whose exterior surfaces are exposed to outside weather conditions.

2. Description of the Prior Art

The usual central heating system for a building heats or cools the building interior in accordance with temperatures sensed within the building interior. The temperatures established by such a system are comfortable to those located at the building core, but often not to those located at the building perimeters. This is because heat losses to the exterior and heat gains from the exterior are most noticeable to occupants of the building perimeter.

Various systems exist in the prior art to bring the temperature of the building perimeter into closer correspondence with the temperature of the building core. Baseboard heaters or coolers have been used adjacent the exterior building walls to heat or cool the perimeter according to various sensed conditions. One system of the prior art operates the baseboard temperature change system in accordance with control signals provided by an air temperature sensor located on an interior surface of an exterior wall of the building. This type of system is unsatisfactory because the sensor is responsive only to the inside temperature near the wall, and is influenced by the wall temperature, which can lag by many hours the actual changes in the heat loss from or heat gain to the perimeter. For example, a rapid change in perimeter heating or cooling requirements at windows can occur because of a change in the relative position of the sun, or because of a rapid change in wind velocity. Wall mounted sensors do not respond rapidly enough, and in the proper amount, to compensate for such changes.

Another system of the prior art uses a plurality of temperature sensors whose output is combined in a particular way to regulate the perimeter heating and cooling system. One of the sensors is located to sense inside air temperature at the building core, another is located to sense outside air temperature, another located to sense the temperature adjacent the perimeter temperature change system, and others are located to respond to the radiant heat of the sun. Despite the sophistication and complexity of such a system, it still does not operate the perimeter heating and cooling system in a manner accurately anticipatory of the actual changes occurring at the building perimeter as a result of environmental conditions.

Yet another prior art system involves simply measuring the outside air temperature and varying the heating and cooling proportionally, ignoring the effects of sun and wind conditions. This system has also failed to meet the problems of perimeter temperature control.

SUMMARY OF THE INVENTION

According to the present invention, a control apparatus is provided for regulating a building perimeter temperature change system through utilization of a heat flow sensor adapted to be mounted in heat exchange relation to a surface of a thermally conductive building element, such as a window, whose exterior surface is exposed to outside weather conditions. The sensor is reactive to net heat flow through the building element to generate a sensor signal in direct proportion to the rate of net heat flow taking place at any given time. The sensor signal operates a controller which controls the perimeter temperature change system so that the heat output or cooling of the system is proportional to the rate of heat loss or gain through the building element. Neither inside nor outside air temperature measurements are required, nor are measurements of outside air velocity and solar energy required. Instead, the heat flow sensor measures the net effect of all of these parameters which affect heat flow through the building element to which it is attached.

The heat flow sensor signal is independent of the absolute temperature of the sensor, being responsive only to net heat flow through it.

All surfaces of the heat flow sensor should have thermal radiation characteristics similar to the surfaces they represent. This is best accomplished under typical conditions by making all surfaces thermally black.

The controller means in one embodiment includes a gain means or adjustment to adjust the performance of the system according to the particular needs of the building with which it is associated. Thus, the gain adjustment controls the proportionality between the level of sensor signal and the degree to which the perimeter temperature change system is turned on. For example, the gain adjustment can be used to account for the relationship between the window area and the maximum power rating of the perimeter change system. It can also be used to change the relationship between heat loss and heat generation to achieve most economical operation while maintaining an acceptable comfort condition.

The controller means may also include a bias means to shift the power demand curve of the perimeter temperature change system up or down. Thus, a downward shift of the demand curve would cause the temperature change system to shut off prior to a zero or null heat sensor signal, thereby shutting off a baseboard heater, for example, at a predetermined low heat loss condition.

Other objects and features of the present invention will become apparent from consideration of the following description taken in connection with the accompanying drawings.

DESCRIPTION OF THE PREFERRED EMBODIMENT

Figure 1:
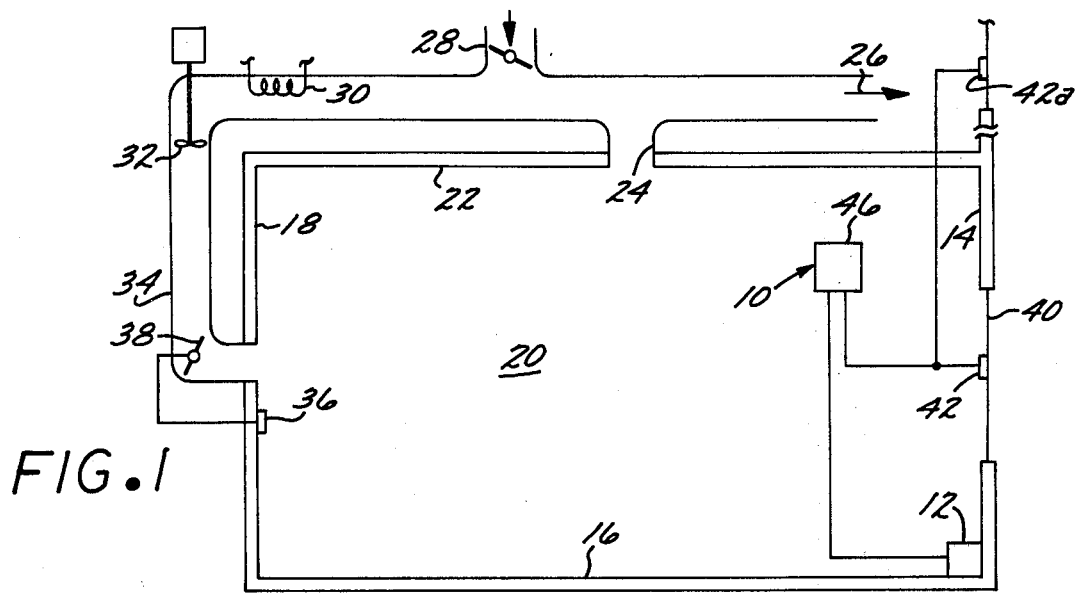
FIG. 1 is a diagrammatic view of the present control apparatus installed in a building utilizing a typical central heating system.

Referring now to the drawings, and particularly FIG. 1, a control apparatus 10 is illustrated for regulating a temperature change system 12 which, in the embodiment illustrated, includes both a baseboard electrical resistance heater 13 and a conventional cooler 15, the units typically being located along an outer wall 14 on the floor 16 of a building.

The outer surface of the wall 14 is exposed to the environment. Its inner surface defines the inner wall of a typical room in the building, the room further being defined by an inner wall 18 opposite the wall 14, the floor 16, a pair of side walls 20, only one of which is illustrated, and an upper wall or ceiling 22.

The present control apparatus 10 is adapted to cooperate with a variety of types of central heating systems, and the central heating system diagrammatically illustrated in FIG. 1 is merely exemplary. The illustrated system comprises an arrangement of conduits for drawing warm air out of the room by a duct 24 opening through the ceiling 22. Part of the air drawn out of the room is exhausted to the environment, as indicated by the arrow 26, and part is recirculated and mixed with fresh outside air entering through a conduit 28. This mixture of air is drawn over cooling coils 30 by a fan 32 which returns the cooled air to the building by means of a duct 34 opening into the room through the inner wall 18.

The air is cooled to a predetermined temperature of 55° F., for example, and the amount of cooled air allowed to pass into the room is controlled by a room air temperature thermostat 36 located on the inner wall 18 and operative to adjust the degree of closure of a damper 38 in the conduit 34.

The central heating system disclosed is generally effective to maintain the inner portion or "core" of the room at a relatively comfortable level. However, assuming that it is cold outside, there will be a heat loss through the outer wall 14, and particularly through relatively highly heat-transparent building elements such as the usual window 40. The object of the system 12 is to provide a curtain of warm air or cool air adjacent the outer portion or perimeter of the room to make up for heat loss or heat gain, respectively, through the window and thereby maintain a temperature near the building perimeter which approximates the temperature at the building core.

By way of example, although the temperature change system 12 includes both the heater 13 and the cooler 15, the present invention comprehends a system in which only a heater or a cooler may be used.

The temperature change system 12 is regulated by the present control apparatus 10 to provide perimeter heating or cooling in response to the net loss or gain of heat experienced by virtue of outside or atmospheric conditions. As will be seen, the apparatus 10 causes the system 12 to supply heat in proportion to the heat loss from the building and to supply proportional cooling when net heat flow is into the building.

The present control apparatus thus makes maximum use of available solar heat input to the building during cold, clear weather by minimizing the amount of makeup heating provided by the system 12, and thus affords significant fuel savings without loss of a comfortable temperature level throughout the building.

The term "central heating system" is used in its broad sense in this disclosure to denote any system which conditions air by either or both heating and cooling. The system illustrated, for example, is primarily a cooling system during daytime building occupancy, relying for heat upon the heat radiated from the interior lighting equipment and the occupants.

The control apparatus 10 operates on the principle of regulating the operation of the system 12 in direct proportion to the rate of net heat loss or heat gain taking place through the exterior building elements, as established by a heat flow sensor 42 attached to the inner surface of the window 40 by any suitable means, such as by a cement, adhesive, tape or mechanical clamping mechanism. The sensor 42 could be attached to the interior surface of the wall 14, if desired, but the heat flow through the wall 14 is not as rapid as the relatively heat-transparent window 40. Therefore attachment to the window 40 is preferred. Also, the sensor 42 could be attached to the outer surface of the window 40, assuming the sensor surfaces have thermal radiation characteristics similar to the surfaces they represent, as will be apparent to those skilled in the art. The sensed net heat flow would be essentially the same as that sensed through attachment to the interior of the window, but convenience and accessibility make inside attachment preferred. In addition, the sensor 42 is preferably spaced from the window edges enough to eliminate window edge heating effects, a suitable spacing being about three inches.

The form of heat flow sensor 42 utilized is not critical to the present invention so long as its output signal is proportional to the net heat flow through the building element 40. The sensor 42, for example, may be a thermoelectric device or thermopile such as that disclosed in U.S. Pat. No. 3,542,123, to which reference is made for details respecting one suitable form of sensor 42.

A heat flow sensor 42 is commercially obtainable with a time constant in the approximate range of 0.5 seconds to several minutes. This range is desirable in the present apparatus because, when combined with a conventional power controller 44 forming a part of the temperature change system 12, sudden changes in atmospheric conditions can be detected and corrective actuation of the power controller 44 initiated in sufficient time to effect makeup heating or cooling, as needed. As will be apparent to those skilled in the art, the controller 44 proportionally turns on the heat or proportionally turns on the cooling, in response to the magnitude and direction of heat flow as sensed by heat flow sensor 42.

In contrast, prior art perimeter temperature change control systems are, as previously indicated, primarily responsive to one or more air temperature measurements taken at the inside and the outside of the building, including measurements of outside air velocity and solar energy incident on the building. Such systems are often characterized by measured values that are not representative of local conditions on the building, thus giving incorrect perimeter temperature control. Such systems also have all the difficulties associated with mounting sensors on the outside of buildings, such as undesirable holes in the building for mounting the sensors, damage to the sensors from icing conditions or from window washers, and the like.

The heat flow sensor 42 measures the net effect of the various parameters affecting room temperature, and the output signal of the sensor 42 is independent of its absolute temperature. It is only responsive to net heat flowing through it. Thus, if there is no outside wind, and the outside air is at a temperature of $-10°$ F., with the desired inside temperature being 72° F., the loss of heat could be the same as if the outside temperature were $+20°$ F. with a high velocity wind blowing. Likewise, if the sun is shining on the building at the same time that the outside air temperature is $-10°$ F., and the wind is blowing, the net heat loss could even be 0, if the energy input from the sun were equal to the convective heat loss. The sensor 42 summarizes all of this information in a single sensor signal to effect proportional heat output from the temperature change apparatus 12.

The surface of the sensor 42 are preferably made thermally black, meaning that they are made to be good radiant heat absorbers over the spectral range of the sun shining through the window and over the spectral range of radiation from objects inside the building radiating back to the window 40. Black anodizing of the surfaces is one suitable means for providing a thermally black surface.

Figure 2:
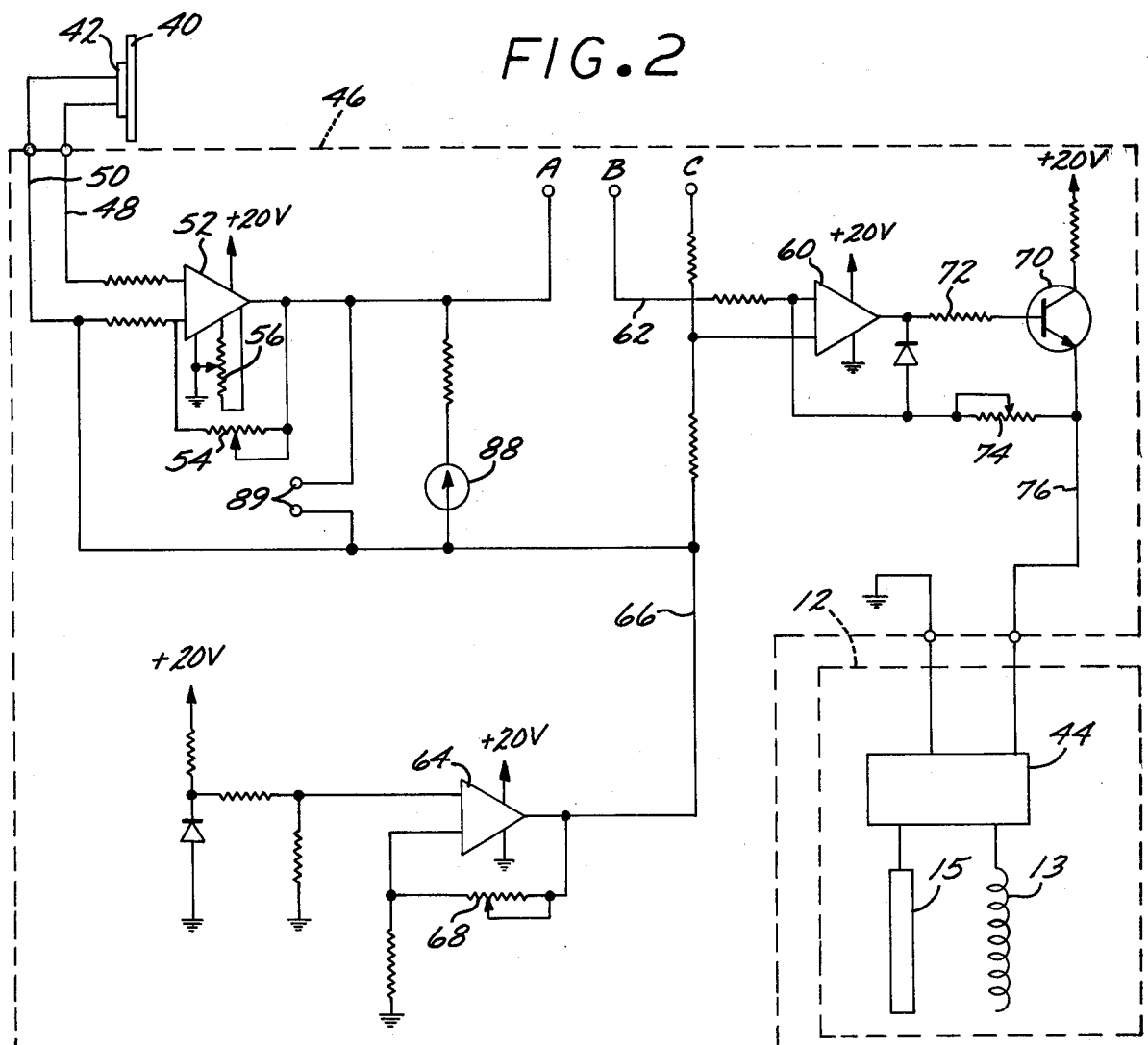
FIG. 2 is a partially schematic wiring diagram illustrating the components of the control apparatus of FIG. 1.

The controller means 46 which is responsive to the output signals of the heat sensor 42 to operate the temperature change system 12 is particularly illustrated in FIG. 2.

The sensor signal from the heat flow sensor 42 is a polarized direct current voltage signal proportional to the net gain or loss of heat through the window 40. It is applied by leads 48 and 50 to the controller means 46, and is amplified by a conventional integrated circuit amplifier 52 whose gain and offset are adjusted by adjustable resistances 54 and 56. The gain and offset are adjusted such that, for a zero or null sensor signal, the output signal of the amplifier 52 is zero relative to the positive sensor lead 50, and for maximum anticipated heat loss, the output signal of the amplifier 52 is two volts D.C. relative to lead 50.

The foregoing values are merely exemplary and can be changed to suit the particular application. Moreover, the values of the circuit components shown in the drawings, and the form of the particular circuitry to accept the sensor signal from the heat sensor 42 and convert it into an amplified proportional control signal for driving the temperature change system 12, may also vary, as will be readily apparent to those skilled in the art. The particular temperature change system 12 chosen for this example requires a 6 to 9 volt D.C. signal to vary power output of the temperature change system 12 from 0 to 100%. The present invention is not limited to the particular circuitry or embodiment disclosed.

The amplified output signal from the amplifier 52 is applied to a second conventional integrated circuit amplifier 60, across a pair of terminals A and B through a lead 62, together with an offset voltage provided by a third conventional integrated circuit amplifier 64 through a lead 66. For this purpose of describing the operation of the controller means 46 of FIG. 2, the terminals A and B are assumed to be electrically coupled. As will be seen subsequently, this coupling may be controlled by other circuits, if desired.

The gain of the amplifier 64 is set by adjustment of an adjustable resistance 68 so that for a zero input signal to amplifier 52, the control signal from the amplifier 60 passing from a transistor 70 which is coupled to the amplifier 60 through a lead 72, is six volts D.C. relative to ground.

The gain of amplifier 60 is adjusted by adjustment of an adjustable resistance 74 so that the control signal from amplifier 60 passing from transistor 70 is that which will achieve the desired proportionality between the power output of the perimeter temperature change system 12 and the heat loss through the window 40. This gain setting is primarily dependent upon the power output capacity of the perimeter temperature change system 12 and the area of the window 40.

The control signal from transistor 70 is coupled through a lead 76 to the power controller 44, which is preferably a silicon-controlled rectifier type. This control signal is operative to cause the power controller 44 to vary the heat output of the system 12, the heat output in the particular embodiment disclosed normally being zero for a six volt control signal, and maximum for a nine volt control signal.

The sensor signal from the heat sensor 42 is proportional to the direction and magnitude of the heat flow through it, being negative when heat is being lost from the building perimeter. This causes the power controller 44 to generate a control signal above six volts to actuate the apparatus 12 and provide heat sufficient to equal that lost from the building perimeter. The curtain of warm air at the building perimeter makes up for the heat loss and maintains a more nearly constant temperature distribution throughout the room from its core to its perimeter. If the sensor signal were positive, the controller 44 would be operated to cause the system 12 to establish a curtain of cooling air at the building perimeter, as will be apparent.

Figure 3:
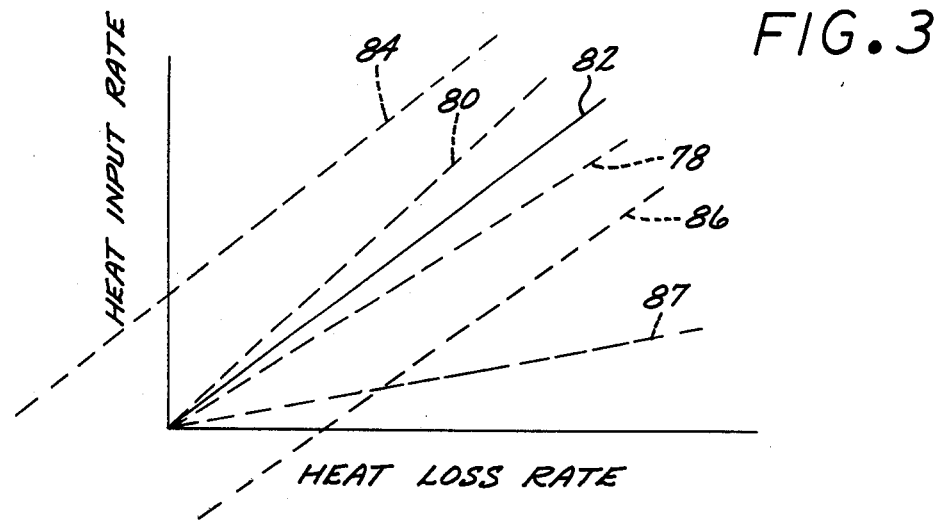
FIG. 3 is a graph showing the temperature change system power demand curve, a typical curve being shown in full line, and adjusted portions of the curve being illustrated in dotted outline.

The adjustable resistance 74 constitutes a gain means or system operative to adjust the slope of the power demand curve of the temperature change apparatus 12. A typical set of power demand curves is illustrated in FIG. 3. The ordinate of the graph is power or heat input rate delivered by the heaters 13, for example, and the abscissa is the heat loss rate from the building. Curve 82 represents a unique condition in which the heat input equals the heat loss. This condition can be achieved by proper gain adjustment. Curve 82 will result in optimum temperature uniformity between the building core and the perimeter but may not be the most economical condition. A change in gain adjustment will result in demand curves illustrated by curves 78 and 80.

Once the gain has been adjusted to provide operation along the power demand curve 82, it is normally desirable to also adjust an adjustable resistor 68, which constitutes a bias means, to shift the power demand curve 82 up or down, as indicated by the dotted lines 84 and 86, respectively, in FIG. 3. For example, the operator of a large building is only interested in heating the building to a point where the occupants are comfortable. It has been found that occupants at the building perimeter are comfortable with some heat going out the window, and the outside temperature can be as low as 55° F. and this is not particularly noticeable to the occupants. Accordingly, by setting the bias down, and thereby establishing a power demand curve such as that indicated at 86, the six volt level of control signal is reached before a true null condition or zero heat sensor signal exists. Consequently, power to the temperature change system 12 is shut off for low heat loss conditions, such as when the outside air temperature is at 55° F. Stated another way, under this condition there can be a loss through the window of 10 watts per square foot of window area, for example, before the heater 13 comes on. The heater is thus always providing 10 watts per square foot less than the heat that is going out the window, which is acceptable because experience has shown that an occupant can tolerate the loss of the 10 watts per square foot without loss of comfort. In contrast, if the operation of the heater is along the ideal power demand curve 82, the heater 13 would be operating whenever the loss through the window was anything above zero, which is inefficient and wasteful of heat.

As seen in FIG. 2, the controller means 46 includes a null meter 88 which yields a positive deviation when there is a net heat gain to the room, while a negative deviation indicates a net heat loss. The meter indication is linear and independent of any bias adjustment.

Figure 4:
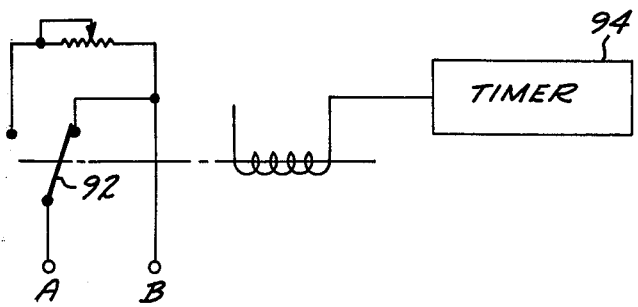
FIG. 4 is a partially schematic wiring diagram of a timer circuit for reducing the gain of the present control apparatus at predetermined times so that only a pre-set fraction of the heat loss is being made up.

The controller means 46 may be provided with a night/day switch 92 across the terminals A and B, as seen in FIG. 4. The switch 92 is operative to its "night" position to drop the gain of the system, as indicated by the power demand curve 87, which is approximately 25% of the daytime power demand curve 82. This is useful during night hours when the building is unoccupied. In the morning the switch 92 is oppositely operated to its "day" position to re-establish the normal power demand curve 82. By making the switch 92 a solenoid actuated switch under the control of a timer 94, the switch 92 can automatically be moved from the illustrated "day" position to the opposite "night" position at 5PM, and back again at 6AM, for example.

Figure 5:
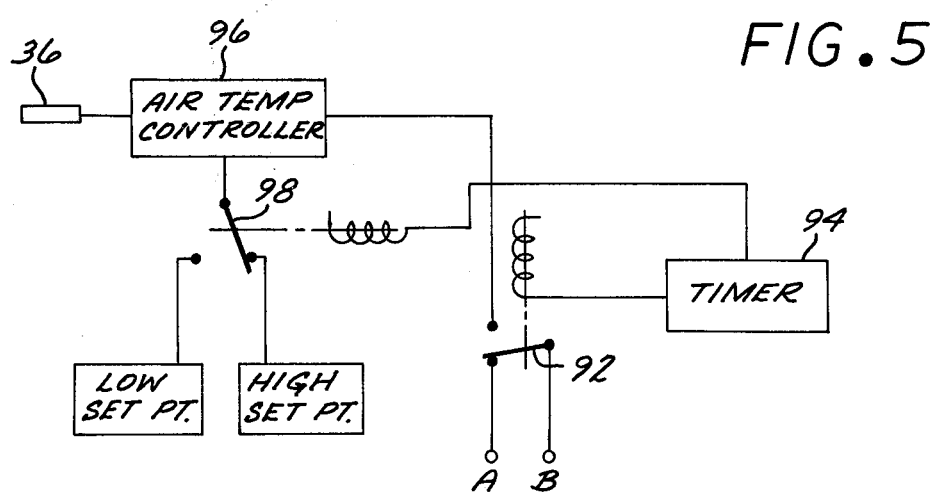
FIG. 5 is a partially schematic wiring diagram of a timer circuit for controlling turn on and turn off of both the central heating system air temperature controller and the present control apparatus at predetermined times.

FIG. 5 illustrates another arrangement for operation of the temperature change system 12. During non-occupancy periods the central heating system is turned off and the building temperature is controlled by the perimeter temperature change system 12. To accomplish this a usual and conventional air temperature controller 96, which is responsive to the thermostat 36, is provided to maintain the building core temperature at low and high set point temperatures of 55° F. and 70° F., respectively, for example, depending upon the position of a solenoid actuated switch 98. The switch 98 is under the control of the timer 94 which moves it from the day position illustrated to the opposite night position at 5PM, for example, and back again at 6AM. The same timer 94 is operative, at 5PM for example, to move the solenoid switch 92 from the day position illustrated, in which the terminals A and B are coupled, to the opposite, night position in which terminal B is coupled to the air temperature controller 96 by a lead 93. As a consequence, during the night the controller 96 operates the temperature change system 12 to maintain building air temperature corresponding to the low set point, depending upon the level of the output signal from the controller 96. At 6AM, for example, the timer 94 actuates the switch 98 to cause the perimeter heater 13 to turn on and bring the building air temperature to the high set point and maintain it at that temperature until 8AM, at which time the building central air conditioning system comes on again by virtue of its own timing system. At 8AM, for example, timer 94 actuates the switch 92 to the day position illustrated, at which time control of the temperature change system 12 is returned from the controller 96 to the present control apparatus 10.

Figure 7:
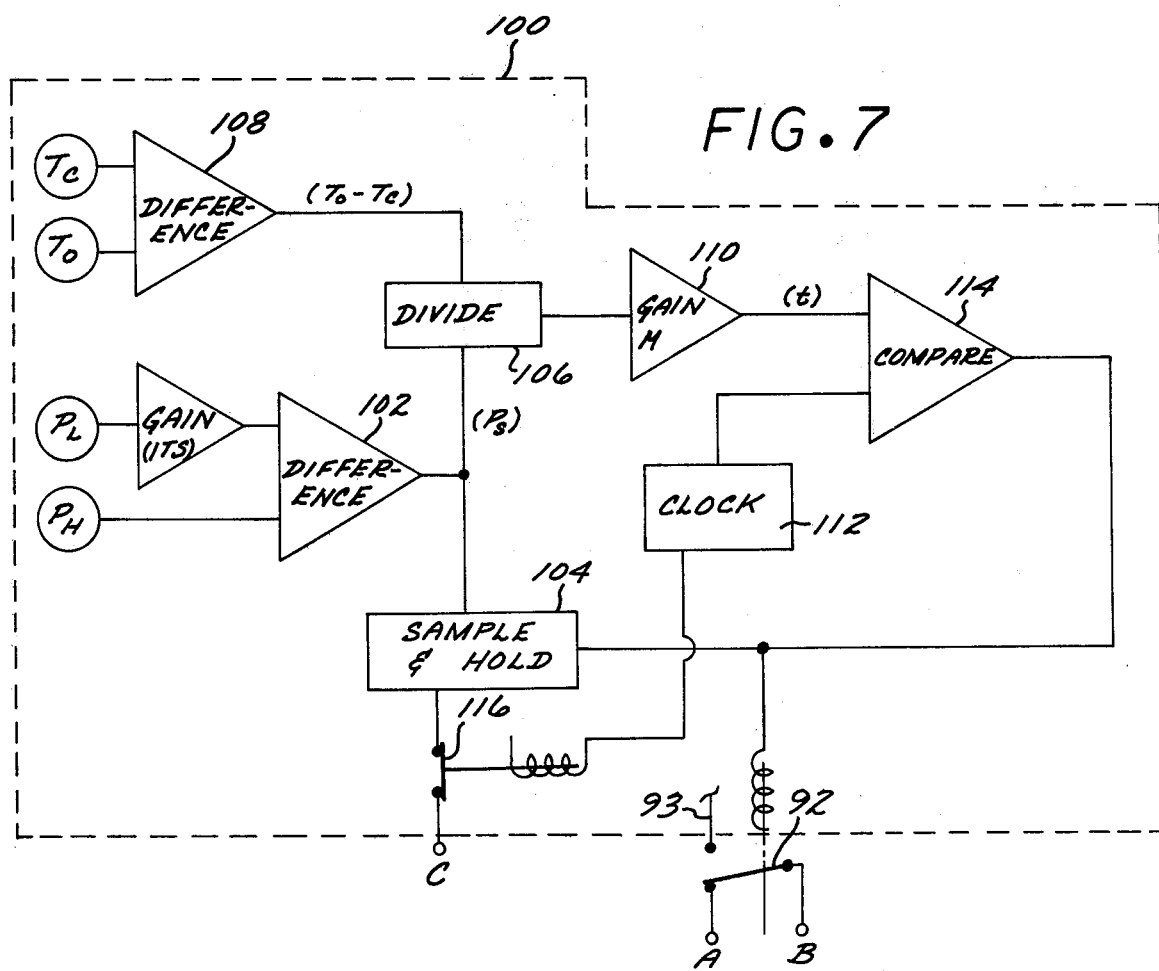
FIG. 7 is a partially schematic wiring diagram of an economizer circuit used in conjunction with the present control apparatus, and responsive to a number of building and environmental variables, to turn on the perimeter temperature change system at a time calculated to achieve a predetermined building temperature approximately at the same time the building is opened in the morning, for example.

With reference to FIG. 7, an economizer system 100 is illustrated which is operative to continually compute the time period it will take to, for example, heat up the building to 70° F. by the beginning of the working day, which is assumed to be 8AM, based upon the net heat loss sensed by the heat sensor 42 and the air temperature sensed by the thermostat 36. At the beginning of that time period the system 100 would cause the heater 13 to be actuated in such a manner that the building would not be heated to 70° F. by 8AM, following a near optimum heat-up pattern.

The time t required to heat the building from a cooldown night temperature of $T_c$ to an operating day temperature $T_o$, is given by the equation $$t = (T_o - T_c)K \qquad \text{(Equation 1)}$$

where K is a constant which is a function of the building mass to be heated, and the portion of the heating capacity of the heater 13 which is not being used to make up for heat loss.

The heat flow sensor 42 measures the rate at which heat is being lost from the building. This heat loss rate $P_L$, modified by a safety factor S, is subtracted from the heating capacity of the heater 13 ($P_H$) to determine the heating capacity $P_S$ available for increasing the temperature of the building.

$$P_S = P_H - P_L(1+S) \qquad \text{(Equation 2)}$$

The constant K can then be rewritten as follows:

$$K = M/P_S = M/P_H - P_L \qquad \text{(Equation 3)}$$

where M is an empirically determined constant unique to each building and primarily dependent upon the mass to be heated.

Equation 1 can be rewritten:

$$t = M \frac{T_o - T_c}{P_H - P_L(1+S)} \qquad \text{(Equation 4)}$$

Since $T_o$ and $P_H$ are known constants and M can be determined empirically for each building, the anticipation time, t, can be continually determined by measuring $T_c$ and $P_L$ and solving equation 4 electronically.

Once the time for turn-on is reached, the heater 13 can be turned on to a biased power level $P_S$ by electronically solving Equation 2 and applying that bias to amplifier 60 at terminal C. The additional power necessary to compensate for losses will then be provided in the same way as during normal daytime operation.

An example of a method of electronically solving equation 2 and equation 4 is shown diagrammatically in FIG. 7. Both $T_o$, the normal building operating temperature, and $P_H$, the heating capacity of the heaters, are constant, which can be represented by a voltage. $T_c$, the measured air temperature, and $P_L$, the rate of heat loss from the building, are also represented by variable voltage signals. Equation 2 is solved by amplifying $P_L$ by a factor of $(1+S)$ and then subtracting it from $P_H$ in a differential amplifier 102, the output being $P_S$. This signal is fed to a sample and hold circuit 104 and to the denominator of a divide circuit 102. $T_c$ is subtracted from $T_o$ at difference means 108, and the difference is fed to the numerator of the divide circuit 102. The dividend is then amplified by a factor of M through an amplifier 110, and the result is a signal representing the time, t, required to heat the building to $T_o$.

In order to perform a turn-on function the signal representing the time, t, is compared against a signal representing the time remaining before occupancy. Such a signal is generated by a clock 112 and compared against t in a comparator 114. When the compared signals are equal the output of the comparator 114 causes the existing value of $P_S$ held in the sample and hold circuit 104 to be transferred to output terminal C. The comparator also actuates the solenoid actuated switch 92, connecting A to B. The resistance in the lead to terminal C applies a bias to the amplifier 60 so that the controller means 46 is operative to turn on the heater 13 proportionally, according to the initiating net heat loss signal from the heat sensor 42, but modified by the bias introduced at the terminal C, so that the heater 13 is operated at, for example, 50 percent of its capacity, plus the additional heating demanded by the air controller means 46. At the time of building occupancy, such as 8 AM, the clock 112 is then operative to actuate a switch 116 and open the circuit to terminal C so that the operation of the heater 13 is without the introduction of any bias from the terminal C.

Figure 6:
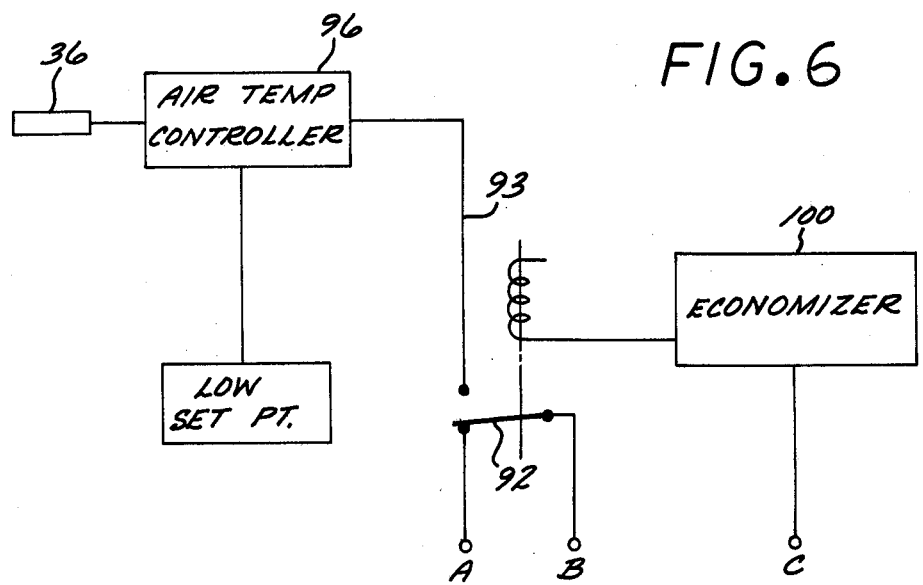
FIG. 6 is a partially schematic wiring diagram of the economizer circuit of FIG. 7 used in conjunction with the perimeter heating system to prevent the associated building from cooling below a predetermined temperature during, for example, the night hours.

A typical situation demonstrating the utility of the arrangement just described is the efficient heat energy management of a large building. Typically, at 5 PM the central heating system is automatically shut off and the air temperature in the building begins to drop. The perimeter temperature control system is also shut off by switch 92. The building temperature drops to a low set point temperature, such as 55° F., and, as seen in FIG. 6, the air temperature controller, responsive to the thermostat 36, controls the building temperature to the low set point temperature of 55° F. This arrangement efficiently conserves energy during the night.

During this time the economizer system 100, utilizing such parameters as the predetermined lag in heating up the building, the rate of heat loss from the building, and the temperature at the core of the building, calculates the amount of time that it will take for the heater 13 to raise the perimeter temperature to 70° F. by 8 AM. At the beginning of that calculated time period, the economizer introduces a bias at the terminal C such that the heater 13 is operated at 50 percent of its capacity. In addition, the economizer system 100 energizes the relay to operate the switch 92 and electrically couple the terminals A and B so that the remaining 50 percent of the capacity of the heater 13 is operated on a modulated basis, dependent upon the level of the initiating signal from the heat sensor 42. At the time of building occupancy, such as 8 AM, the clock 112 is operative to actuate a switch 116 which opens the circuit to the terminal C so that all of the capacity of the heater 13 is now modulated by the action of the controller means 46 responsive to the signal of the heat sensor 42.

It is significant that the present control apparatus 10 does not establish a perimeter temperature zone independently of the temperature zone established at the building core by the central heating system. Instead, the perimeter heating and cooling compensates for perimeter heat losses and gains under all central heating system conditions. If the central system calls for an increased core temperature, resulting in a larger heat loss, the control apparatus 10 compensates for the new loss, maintaining temperature uniformity, with the temperature level better controlled exclusively by the central heating system setting.

As seen in FIG. 2, two terminals 89 are provided in a circuit path in parallel with the meter 88. The terminals 89 can be coupled to a computer to provide a signal which is a measure of the actual building heat loss or gain. As will be apparent, such a computer can be programmed to make decisions, based upon the heat loss or gain signal, and upon other parameters, regarding energy management within the building.

Although the use of only one heat sensor 42 has been described in connection with the various embodiments, a plurality of sensors can be used over different portions of the building, as indicated at 42a in FIG. 1. The various sensors can be electriclly coupled to provide an average sensor signal for application to the controller means 46. Such a signal would be representative of, for example, portions of the building in shade as well as portions of the building in direct sunlight.

Various modifications and changes may be made with regard to the foregoing detailed description without departing from the spirit of the invention.

We claim:

1. Control apparatus for regulating a building temperature change system, said apparatus comprising:
   a heat flow sensor adapted to be mounted in contacting, heat exchange relation to a surface of a thermally conductive building element whose exterior surface is exposed to outside weather conditions, said sensor being reactive to heat flow to or from said building element, independently of the temperature to which said sensor is subjected, to generate a sensor signal proportional to the direction and magnitude of said heat flow; and
   controller means responsive to said sensor signal to operate a building temperature change system for changing the rate of heat addition to or heat extraction from the building interior in proportion to the value of said sensor signal.

2. Control apparatus for regulating a building perimeter temperature change system, said apparatus comprising:
   a heat flow sensor adapted to be mounted in contacting, heat exchange relation to a surface of a thermally conductive building element whose exterior surface is exposed to outside weather conditions, said sensor being reactive to heat flow to or from said building element, independently of the temperature to which said sensor is subjected, to generate a sensor signal proportional to the direction and magnitude of said heat flow; and
   controller means responsive to said sensor signal to operate the perimeter temperature change system for changing the rate of heat addition to or heat extraction from the building perimeter, adjacent said building element, in proportion to the value of said sensor signal.

3. Control apparatus according to claim 1 or 2 wherein said heat flow sensor is characterized by an exteriorly directed radiant heat absorbing surface responsive to the radiation from the sun which passes through the building element.

4. Control apparatus according to claim 1 or 2 wherein said heat flow sensor is characterized by an interiorly directed radiant heat absorbing surface responsive to radiation from objects inside the building.

5. Control apparatus according to claim 2 and including a plurality of said heat flow sensors for mounting to a corresponding plurality of building elements, said plurality of heat flow sensor providing sensor signals, respectively, which are electrically combined for application to said controller means.

6. Control apparatus for regulating a building perimeter temperature change system, said apparatus comprising:

a heat flow sensor adapted to be mounted in heat exchange relation to a surface of a thermally conductive building element whose exterior surface is exposed to outside weather conditions, said sensor being reactive to heat flow to or from said building element, independently of the temperature to which said sensor is subjected, to generate a sensor signal proportional to the direction and magnitude of said heat flow; and controller means responsive to said sensor signal to operate the perimeter temperature change system for changing the interior heating or cooling rate at the building perimeter, adjacent said building element, in proportion to the value of said sensor signal, said controller means being operative to apply a control signal to said perimeter temperature change system for operating said system in proportion to the value of said control signal and along a power demand curve having a predetermined slope, said controller means including gain means operative to adjust the degree of said slope whereby the net heat flow provided by the temperature change system bears a predetermined relation to the net heat flow between the building and the exterior.

7. Control apparatus for regulating a building perimeter temperature change system, said apparatus comprising:

a heat flow sensor adapted to be mounted in heat exchange relation to a surface of a thermally conductive building element whose exterior surface is exposed to outside weather conditions, said sensor being reactive to heat flow to or from said building element, independently of the temperature to which said sensor is subjected, to generate a sensor signal proportional to the direction and magnitude of said heat flow; and controller means responsive to said sensor signal to operate the perimeter temperature change system for changing the interior heating or cooling rate at the building perimeter, adjacent said building element, in proportion to the value of said sensor signal, said controller means being operative to apply a control signal to said perimeter temperature change system for operating said system in proportion to the value of said control signal and along a power demand curve having a predetermined slope, said controller means including bias means operative to raise and lower said power demand curve by changing the level of all said control signals lying along said slope by substantially the same amount.

8. Control apparatus for regulating a building perimeter temperature change system, said apparatus comprising:

a heat flow sensor adapted to be mounted in heat exchange relation to a surface of a thermally conductive building element whose exterior surface is exposed to outside weather conditions, said sensor being reactive to heat flow to or from said building element to generate a heat flow sensor signal proportional to the direction and magnitude of said heat flow;

controller means responsive to said heat flow sensor signal to operate the perimeter temperature change system for changing the interior heating or cooling of the building perimeter adjacent said building element at a first rate in proportion to the value of said heat flow sensor signal;

a gain means; and timer means coupled to said controller means and said gain means and operative at predetermined times to apply said gain means to said controller means for changing said interior heating or cooling at a second rate lower that said first rate, said second rate being in proportion to the value of said heat flow sensor signal.

9. Control apparatus for regulating a building perimeter temperature change system, said apparatus comprising:

a heat flow sensor adapted to be mounted in heat exchange relation to a surface of a thermally conductive building element whose exterior surface is exposed to outside weather conditions, said sensor being reactive to heat flow to or from said building element to generate a heat flow sensor signal proportional to the direction and magnitude of said heat flow;

an air temperature sensor responsive to the temperature of the building interior to generate a temperature sensor signal;

first controller means responsive to said temperature sensor signal to operate the perimeter temperature change system for changing the interior heating or cooling of the building perimeters at a first rate proportional to the value of said temperature sensor signal;

second controller means responsive to said heat flow sensor signal for changing the interior heating or cooling of the building perimeter adjacent said building element at a second rate in proportion to the value of said heat flow sensor signal;

switch means in a first state coupling said first controller means to said temperature change system and in a second state coupling said second controller means to said temperature change system; and timer means operative at predetermined times to move said switch means between said first and second states.

10. Control apparatus according to claim 9 wherein said timer means forms part of an economizer means operative in response to said temperature sensor and heat sensor signals to compute the actuation time in advance of a predetermined time; that said temperature change system must be operated to achieve a predetermined temperature at the building perimeter at said predetermined time, said economizer means further being operative to operate said timer means at said actuation time.

11. Control apparatus according to claim 10 wherein said economizer means includes: first difference means for determining the difference between a desired building working temperature and the measured building temperature; second difference means for determining the difference between the heating capacity of the temperature change system and the rate of heat loss from the building; divide means for dividing the output from said first difference means by the output from said second difference means; sample and hold means for accepting the output from said second difference means; clock means operative for generating an output representative of the clock time remaining for achievement of said predetermined time; and comparison means for comparing the outputs of said divide means and said clock means, and for actuating said switch means to said second state, and for actuating said sample and hold means when said outputs bear a predetermined relationship; and coupling means operative for applying said output from said second difference means to said second controller means when said sample and hold means are actuated whereby said temperature change means is operated at a fixed bias of its capacity, said clock means being further operative at said predetermined time to render said coupling means inoperative.

12. Control apparatus for regulating a building perimeter temperature change system, said apparatus comprising:
- a heat flow sensor adapted to be mounted in heat exchange relation to a surface of a thermally conductive building element whose exterior surface is exposed to outside weather conditions, said sensor being reactive to heat flow to or from said building element to generate a heat flow sensor signal proportional to the direction and magnitude of said heat flow;
- an air temperature sensor responsive to the temperature of the building interior to generate a temperature sensor signal;
- controller means responsive to said heat flow sensor signal to operate the perimeter temperature change system for changing the interior heating or cooling of the building perimeter adjacent said building element at a rate in proportion to the value of said heat flow sensor signal;
- circuit means operative to couple said controller means to said temperature change system;
- economizer means including timer means operative at predetermined times to operate said circuit means, said economizer means being operative in response to said temperature sensor and heat sensor signals to compute the actuation time, in advance of a predetermined time; that said temperature change system must be operated to achieve a predetermined temperature at the building perimeter at said predetermined time; said economizer means further being operative to operate said timer mean at said actuation time, said economizer means further including: first difference means for determining the difference between a desired building working temperature and the measured building temperature; second difference means for determining the difference between the heating capacity of the temperature change system and the rate of heat loss from the building; divide means for dividing the output from said first difference means by the output from said second difference means; sample and hold means for accepting the output from said second difference means; clock means operative for generating an output representative of the clock time remaining for achievement of said predetermined time; and comparison means for comparing the outputs of said divide means and said clock means, and for actuating said circuit means and said sample and hold means when said outputs bear a predetermined relationship; and coupling means operative for applying said output from said second difference means to said controller means when said sample and hold means are actuated whereby said temperature change means is operated at a fixed bias of its capacity, said clock means being further operative at said predetermined time to render said coupling means inoperative.

* * * * *